(12) United States Patent
Dezent et al.

(10) Patent No.: US 10,862,911 B2
(45) Date of Patent: Dec. 8, 2020

(54) SYSTEM, DEVICE, AND METHOD OF ADAPTIVE NETWORK PROTECTION FOR MANAGED INTERNET-OF-THINGS SERVICES

(71) Applicant: Allot Communications Ltd., Hod-Hasharon (IL)

(72) Inventors: Nimrod Dezent, Kfar Saba (IL); Itai Ephraim Zilbershtein, Hod HaSharon (IL); Asaf Shahar, Kfar Saba (IL)

(73) Assignee: ALLOT LTD., Hod Hasharon (IL)

( * ) Notice: Subject to any disclaimer, the term of this patent is extended or adjusted under 35 U.S.C. 154(b) by 283 days.

(21) Appl. No.: 16/018,076

(22) Filed: Jun. 26, 2018

(65) Prior Publication Data
US 2018/0375887 A1    Dec. 27, 2018

Related U.S. Application Data

(60) Provisional application No. 62/525,202, filed on Jun. 27, 2017.

(51) Int. Cl.
*H04L 29/06* (2006.01)
*H04L 29/08* (2006.01)
(Continued)

(52) U.S. Cl.
CPC ........ *H04L 63/1425* (2013.01); *H04L 41/142* (2013.01); *H04L 43/026* (2013.01);
(Continued)

(58) Field of Classification Search
CPC ... H04L 63/1425; H04L 67/303; H04L 43/12; H04L 43/026; H04L 63/145;
(Continued)

(56) References Cited

U.S. PATENT DOCUMENTS

| | | | |
|---|---|---|---|
| 6,959,265 B1 * | 10/2005 | Candela | G06F 11/3409 370/254 |
| 8,516,104 B1 * | 8/2013 | Liu | H04L 43/16 379/133 |

(Continued)

*Primary Examiner* — Kambiz Zand
*Assistant Examiner* — Aubrey H Wyszynski
(74) *Attorney, Agent, or Firm* — Eitan Mehulal Sadot

(57) ABSTRACT

System, device, and method of adaptive network protection for managed Internet-of-Things (IoT) services. A network traffic monitoring unit monitors data traffic, operations-and-management traffic, and control messages, that relate to cellular communication between an IoT device and a core cellular network. An IoT grouping unit groups multiple IoT devices into a particular IoT group. A baseline behavior determination unit determines a Regular Baseline Cellular Communication Behavior (RBCCB) profile that characterizes the cellular communications that are outgoing from and incoming to each member of the particular IoT group. An outlier detector subsequently detects that a particular IoT device of that particular IoT group, exhibits cellular traffic characteristics that are abnormal relative to the RBCCB profile that was characterized for that particular IoT group. An enforcement actions generator is triggered to selectively perform one or more enforcement operations, notification operations, and quarantine operations.

50 Claims, 3 Drawing Sheets

(51) Int. Cl.
*H04L 12/26* (2006.01)
*H04L 12/24* (2006.01)
*H04W 12/12* (2009.01)
*H04W 4/70* (2018.01)
*H04L 29/12* (2006.01)

(52) U.S. Cl.
CPC ............ *H04L 43/062* (2013.01); *H04L 43/08* (2013.01); *H04L 43/12* (2013.01); *H04L 63/145* (2013.01); *H04L 63/1458* (2013.01); *H04L 63/20* (2013.01); *H04L 67/12* (2013.01); *H04L 67/30* (2013.01); *H04L 67/303* (2013.01); *H04W 4/70* (2018.02); *H04W 12/1208* (2019.01); *H04L 41/16* (2013.01); *H04L 43/0876* (2013.01); *H04L 43/106* (2013.01); *H04L 61/2007* (2013.01); *H04L 67/02* (2013.01)

(58) Field of Classification Search
CPC . H04L 43/062; H04L 41/142; H04L 63/1458; H04L 63/20; H04L 67/12; H04L 43/08; H04L 67/30; H04L 41/16; H04L 43/106; H04L 43/0876; H04L 61/2007; H04L 67/02; H04W 12/1208; H04W 4/70
USPC .............................................................. 726/3
See application file for complete search history.

(56) References Cited

U.S. PATENT DOCUMENTS

| 8,548,427 | B2* | 10/2013 | Chow | H04M 15/8228 |
| | | | | 455/406 |
| 2015/0101053 | A1* | 4/2015 | Sipple | H04L 63/1425 |
| | | | | 726/24 |
| 2016/0036647 | A1* | 2/2016 | Gonzalez | H04L 41/0883 |
| | | | | 370/241 |
| 2016/0173511 | A1* | 6/2016 | Bratspiess | H04L 63/1425 |
| | | | | 726/23 |

\* cited by examiner

SYSTEM, DEVICE, AND METHOD OF ADAPTIVE NETWORK PROTECTION FOR MANAGED INTERNET-OF-THINGS SERVICES

CROSS-REFERENCE TO RELATED APPLICATIONS

This application claims benefit and priority from U.S. provisional patent application No. 62/525,202, filed on Jun. 27, 2017, which is hereby incorporated by reference in its entirety.

FIELD

The present invention relates to network-connected devices, and particularly to "Internet of Things" (IoT) devices.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, Instant Messaging (IM), video conferences, playing games, or the like.

An "Internet of Things" (IoT) device is an appliance, machine or device that is able to communicate over a network with a remote server or with a remote recipient. For example, an IoT lightbulb may enable a user to control such lightbulb through his smartphone. Similarly, an IoT smoke detector may provide alert notifications to a smartphone of a remote user if smoke is detected.

SUMMARY

Some embodiments of the present invention may provide systems, devices, and methods of adaptive network protection for managed Internet-of-Things (IoT) services. For example, a network traffic monitoring unit monitors data traffic, operations-and-management traffic, and control messages, that relate to cellular communication between an IoT device and a core cellular network. An IoT grouping unit groups multiple IoT devices into a particular IoT group. A baseline behavior determination unit determines a Regular Baseline Cellular Communication Behavior (RBCCB) profile that characterizes the cellular communications that are outgoing from and incoming to each member of the particular IoT group. An outlier detector subsequently detects that a particular IoT device of that particular IoT group, exhibits cellular traffic characteristics that are abnormal relative to the RBCCB profile that was characterized for that particular IoT group. An enforcement actions generator is triggered to selectively perform one or more enforcement operations, notification operations, and quarantine operations.

The present invention may provide other and/or additional advantages and/or benefits.

DETAILED DESCRIPTION OF SOME DEMONSTRATIVE EMBODIMENTS

Figure 1:
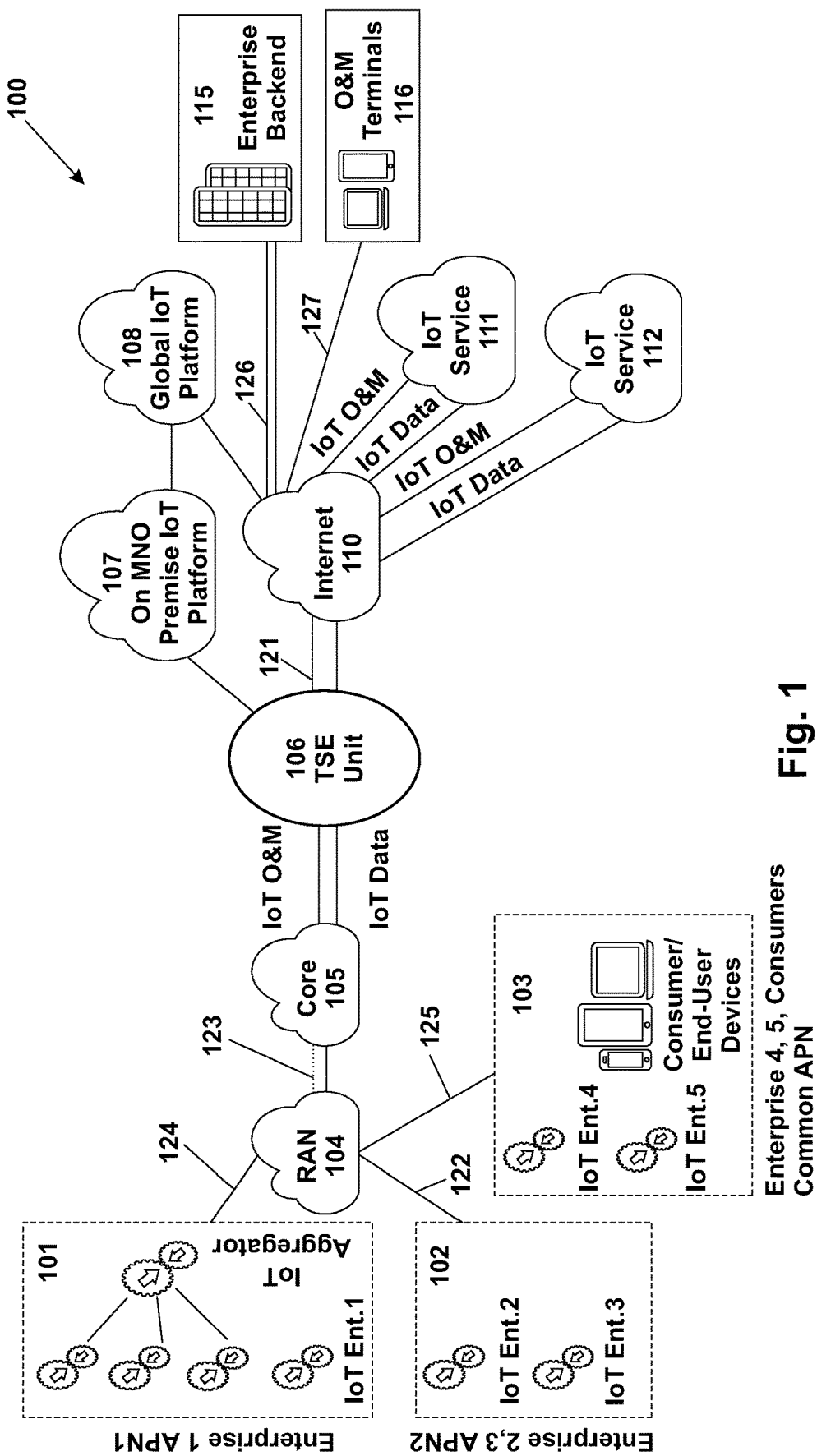
FIG. 1 is a schematic illustration of a system, in accordance with some demonstrative embodiments of the present invention.

The term "IoT service" may comprise or may be a distinct IoT-based service or unit or device or module or sensor, such as, for example, soda vending machines, cameras, Internet-connected cameras, Internet Protocol (IP) connected devices or sensors, IP-camera, IP-sensor, or other network-connected devices that are employed or managed or administered by a specific corporation or entity or organization. For example, a corporation or an organization may utilize multiple "IoT services" or multiple such IoT devices or sensors concurrently, typically spread across multiple or numerous geo-spatial locations, or covering an area or region.

The term "managed IoT service" may comprise or may be an "IoT service" receiving IoT-specific offering from a corresponding Communication Service Provider (CSP), distinct from the general population of the CSP subscribers such as mobile phones. In accordance with the present invention, the exact offering details may vary between CSPs; it may comprise cyber-security and network protection as part of a value proposition, mainly addressing the following high-level concerns: (1) Service continuity; (2) Data exfiltration, data leak prevention; (3) Reputation protection, IoT device abuse protection.

The present invention comprises a centralized network system for CSPs, providing automated protection for managed IoT services under their control, via adaptive learning; requiring little or no manual provisioning and/or manual supervision, and featuring automated or automatic detection of security-related issues or threats, and (optionally) automated or semi-automated fixing of security-related problems or threats.

The Applicants have realized that the collection of IoT devices comprising a managed IoT service, typically presents or exhibits a relatively (or generally) coherent, consistent, stable and/or predictable network behavior, which can be monitored and tracked and logged, and which can be utilized in order to detect an anomaly or irregular network activity of IoT device(s), particularly if such IoT devices that were compromised (e.g., by an attacker, a human attacker, an automated attack unit) and/or that are defective or malfunctioning. This is contrasted with a general population of network hosts, including mobile phones and personal computers, which normally present considerably less predictable and/or less network behavior.

For example, the Applicants have realized that a set of end-user devices, such as smartphones and laptops of employees of an organization, exhibit less predictable network activity and/or data traffic activity; for example, since a first end-user may utilize his device to perform only local word processing operations and may barely communicate over the network, whereas a second end-user may utilize her device to engage in high-bandwidth video conferencing activity; and such usage patterns are often unpredictable. In contrast, a set of IoT devices, such as, an array of Internet-connected vending machines, or an array of Internet-connected smoke detectors, exhibit a generally stable and predictable network behavior and/or traffic activity; for example, each vending machine sends 3 kilobytes of data every hour on the hour, and also sends additional 7 kilobytes of data once a day at 3 AM. Accordingly, the system of the present invention may utilize this information in order to detect anomalies; for example, observing that ten vending machines are currently sending 800 kilobytes of data every 12 minutes, or that one vending machine is currently sending 240 kilobytes of data every minute, triggers a determination that this or these vending machine(s) is (or are) malfunctioning and/or compromised.

Reference is made to FIG. 1, which is a schematic illustration of a system 100, in accordance with some demonstrative embodiments of the present invention. System 100 depicts a demonstrative deployment options for managed IoT services within (or in relation to) one or more Mobile Network Operator (MNO) networks, in accordance with some demonstrative embodiments of the present invention.

For demonstrative purposes, three sets of IoT devices are shown, denoted set 101, set 102, and set 103. Each set of IoT devices, or each IoT device, communicate (directly, or indirectly via an IoT aggregator) with a Radio Access Network (RAN), which in turn communicates with a Core Network 105) of a Communication Service Provider (CSP). The core network communicates with the Internet 110, utilizing two separate communication channels: an Operations, Administration and Management (OA&M, or O&M) channel, and a data traffic channel. IoT Service A (111) and IoT Service B (112) are demonstrative added-value services that are provided by the CSP to the enterprise owning the IoT devices. An enterprise backend 115 and/or OA&M Terminals 116 are utilized to administer, control and manage the IoT devices of the enterprise.

The first set 101 of IoT devices belong to Enterprise 1, and they communicate with RAN 104 indirectly, via an IoT Aggregator unit or node. This set 101 of IoT devices, with their respective IoT aggregator, utilizes a dedicated Access Point Name (APN) that is dedicated to that particular Enterprise 1, and is denoted APN1.

The second set 102 of IoT comprises: IoT devices belonging to Enterprise 2, and IoT devices belonging to Enterprise 3. They communicate with RAN 104 via a dedicated APN, denoted APN2, which is dedicated only to the IoT devices that belong to Enterprise 2 and Enterprise 3.

The third set of IoT devices 103 comprises: IoT devices belonging to Enterprise 4, and IoT devices belonging to Enterprise 4, and consumer/end-user devices (e.g., smartphones, tablets, laptop computers) belonging to various individual subscribers. They communicate with RAN 104 via a non-dedicated Common APN, denoted APN3, which is utilized by the IoT devices that belong to Enterprise 4 and/or to Enterprise 5 and/or by end-user device of other subscribers or users (e.g., non-IoT devices, but rather, end-user devices that are operated by human users).

As demonstrated, the network access of an IoT device may be Direct or Indirect. In a Direct network access, each IoT device connects directly to the RAN of the CSP network. In an Indirect network access, multiple IoT devices connect to an IoT access aggregator, which in turn communicates with the RAN of the CSP network.

As demonstrated, the network access may utilize a dedicated APN or a common APN. For example, a dedicated APN may be used for managed IoT services, per corporate customer; such that all IoT devices pertaining to the managed IoT services of said particular customer utilize a customer-dedicated APN. Additionally or alternatively, dedicated APN may be used for managed IoT services that are shared among multiple corporate customers; such that all the IoT devices pertaining to a set of managed IoT services (and belonging to multiple different customers) use a dedicated APN, distinct from APNs used by other types of subscribers (e.g., mobile phones). Additionally or alternatively, a common APN may be used, such that IoT devices pertaining to a set of managed IoT services utilize a common APN, which is also utilized by the general subscriber population (e.g., mobile phones).

The system may utilize a suitable RAN 104, for example, Third Generation Partnership Project (3GPP), Narrow-Band IoT (NB-IoT), 4G/Long Term Evolution (LTE), Universal Mobile Telecommunications System (UMTS), or other RAN types; including for example, IoT-specific RAN types such as LoRa, Sigfox, or the like.

The communication channels used by the system include an Operations, Administration and Management channel (OA&M channel, or O&M channel); such as, a dedicated channel for OA&M operations, between IoT devices and an IoT OA&M platform. The OA&M platform may reside on MNO premise, and/or on the public Internet (such as within a public cloud). The OA&M channel may be secured, for example, via Virtual Private Network (VPN) tunneling.

The communication channels used by the system further include a data channel; such as, data traffic between IoT devices and the public Internet, which is not covered by (or not transported by) the OA&M channel. This may include applicative traffic between IoT devices and their corresponding backend, depicted as "IoT service" cloud icons.

A Traffic Sensing and Enforcement (TSE) unit 106 may be deployed at one or more suitable points or nodes, or between particular network nodes or network elements; for example, in the MNO's core network in an inline manner, where the TSE unit 106 has visibility of (and can listen to, or monitor) the network traffic of managed IoT services. In some embodiments, optionally, this network deployment may correspond to (or may utilize) the Gi interface in 3GPP architecture, or other suitable interface. In some embodiments, optionally, the TSE unit 106 may optionally be associated with, or may optionally be controlled by or accessible by, an IoT platform 107 located on MNO premise; which in turn may be accessible by, and/or may communicates with, a global IoT platform 108; or, in some implementations, optionally, the TSE unit 106 may be associated with, or report to (or send alerts or notifications to) another suitable IoT back-end element or IoT control panel or IoT management unit.

For demonstrative purposes, a single TSE unit 106 is shown; however, two or more TSE units may be utilized, and a processor or a decision-making unit may operate based on data that is monitored or collected by such multiple TSE units. Additionally or alternatively, for demonstrative purposes, the TSE unit 106 is shown as located at network point 121, which is between the CSP core network 105 and the Internet 110; however, one or more such TSE unit(s) may be deployed in other network location(s), for example, at location 123 between the RAN 104 and the CSP core network 105, at location 124 between the RAN 104 and the first set 101 of IoT devices having an IoT aggregator, at location 122 between the RAN 104 and the second set 102 of IoT devices, at location 125 between the RAN 104 and the third set 103 of IoT devices, and/or even as post-Internet listening/monitoring nodes such as at locations 126 and/or 127.

The various TSE unit(s) may monitor one or more types of packets or data-streams; for example, data traffic, payload, headers, OA&M packets or messages, signaling and/or control messages, Internet Protocol (IP) packets, IPv4 packets, IPv6 packets, cellular packets, non-IP packets, packets having cellular-network internal format, Packet Data Protocol (PDP) format, 3GPP data or packets, 2G or 3G or 4G or 4G-LTE or 5G data or packets, or the like.

In some embodiments, one or more TSE unit(s) may be connected or deployed (and may monitor network traffic and/or packets) at a location or node which is, for example, post-PGW (after the Packet Data Network Gateway of a mobile core network, such as, monitoring and/or analyzing and/or filtering or quarantining traffic that the PGW outputs or transfers-out or relays), or at a location that interfaces between an LTE network and other packet data networks (such as the Internet, or SIP-based IMS network); or at a location or node between the Serving Gateway (SGW) and the PGW, or between a 2G system and PGW, or at a location between 3G system and PGW, or between LTE system and other 3GPP-based system, or even between an Evolved Node B (or eNodeB, or eNB, or E-UTRAN Node B) and the SGW, or at an interface or relay node of network element of a mobile phone network that communicates directly wirelessly with the mobile handset (User Equipment or UE). Accordingly, the TSE unit(s) may monitor and/or analyze the output that is generated or outputted or relayed or passed-through by any of the above-mentioned units or nodes or network elements.

It is clarified that the TSE unit(s) of the present invention may perform not only traffic monitoring and traffic analyzing operations, but rather, may also perform one or more mitigation operations once an anomaly or abnormality is detected or is estimated; for example, a quarantine process that effectively quarantines an IoT device that is determined (or estimated) to be compromised or malfunctioning, by blocking or discarding or non-relaying packets and/or signals and/or messages and/or payload that are received from such IoT device (e.g., all such outgoing traffic from the IoT device, or selectively only a portion of the outgoing traffic that is intended to reach a particular destination) and/or that are directed to such IoT device (e.g., all such incoming traffic that is directed towards the IoT device, or selectively only a portion of the incoming traffic that is intended to reach the IoT device from a particular sender). The selective quarantining operations may thus isolate the malfunctioning or the compromised IoT device from other hosts or destinations or servers on the network, and/or may isolate the malfunctioning or the compromised IoT device from the public Internet and/or from one or more particular destinations or particular senders and/or from one or more particular domains or servers; thereby curtailing or mitigating or eliminating possible damage that may be caused by further communications from or to such malfunctioning or compromised IoT device.

Figure 2:
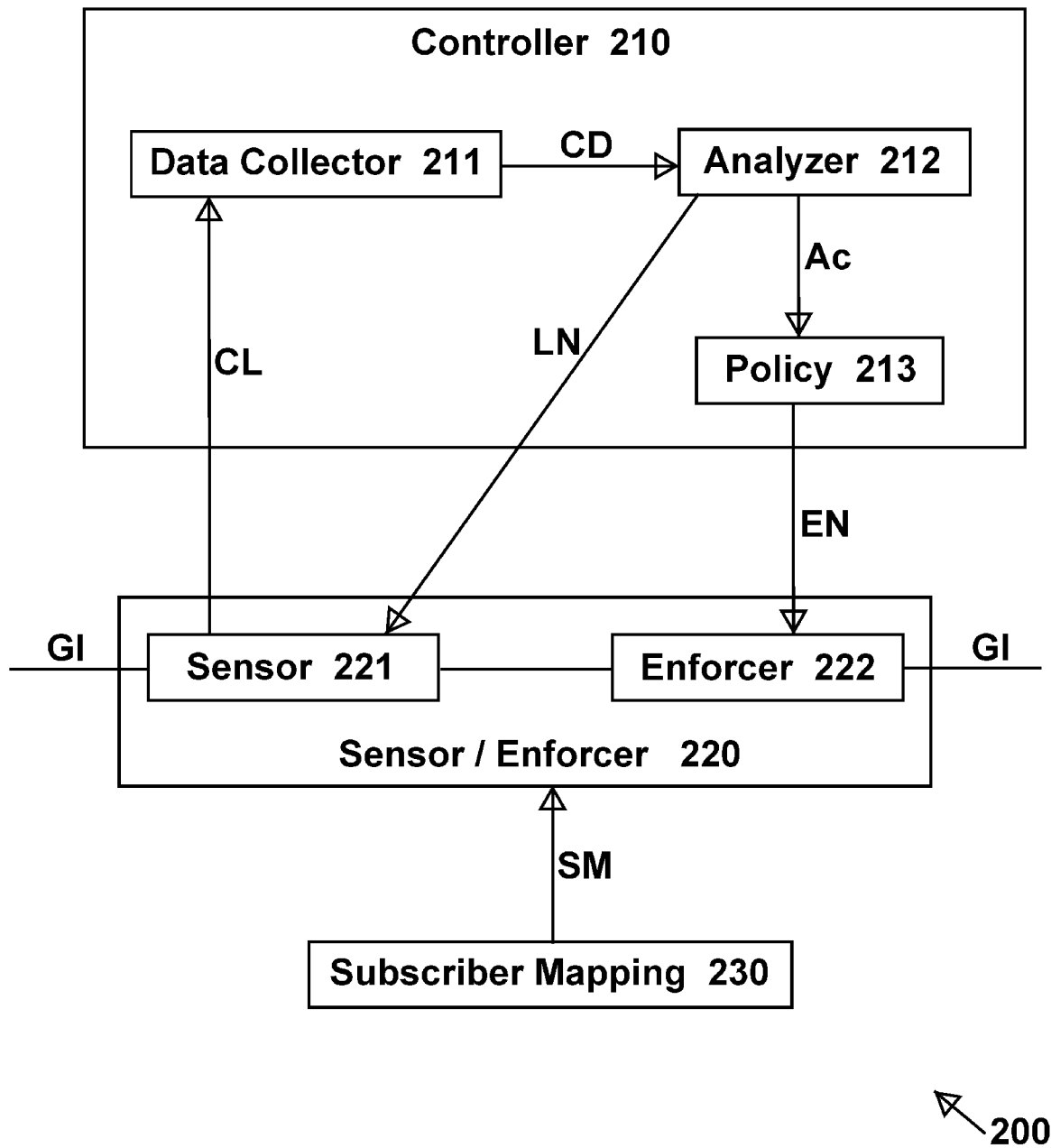
FIG. 2 is a schematic illustration of a sub-system, in accordance with some demonstrative embodiments of the present invention.

Reference is made to FIG. 2, which is a schematic illustration of a sub-system 200, in accordance with some demonstrative embodiments of the present invention. Sub-system 200 may be, for example, a demonstrative implementation of (or a part of) the TSE unit 106 of FIG. 1, or a component of system 100 of FIG. 1, or a sub-system implemented at network location 121 and/or 122 and/or 123 and/or 124 and/or 125 and/or 126 and/or 127, or a sub-system implemented within (or in conjunction with) the CSP core network 105 and/or the RAN 104. Sub-system 200 may be implemented using one or more units or modules, for example, a controller 210 and a sensor/enforcer 220.

A Sensor Unit 221, or other sensing or listening or tracking or monitoring unit, sees or listens or monitors or tracks or captures or collects all the relevant network traffic (e.g., via Gi interface), as well as subscriber (IoT device) address mapping information (e.g., provided by a Subscriber Mapping unit 230, via Sm interface).

The mapping may be performed, for example, in two stages: (i) identifying which traffic (e.g., directed to which IP address, and/or incoming from which IP address) belong to which Subscriber Identity Module (SIM) card (e.g., based on International Mobile Subscriber Identification (IMSI) process or data, based on Mobile Station International Subscriber Directory Number (MSISDN identification process or data); (ii) identifying the type of IoT device, such as by mapping or classifying a particular IoT device into a class or group or type of IoT devices (e.g., soda vending machines; metering units of an electric company; smoke detectors; or the like).

The first stage, of mapping of traffic to a particular SIM, may be performed based on signaling of the cellular network, such as by extracting the mapping data from the signaling itself, and/or by receiving the mapping data from or via radius accounting from a radius server or a Policy Charging and Control Function (PCRF) of the cellular network.

The second stage, of mapping or classifying a particular SIM card to a particular type of IoT devices, may be performed in one or more suitable ways; for example, based on data received via integration with SIM(s) management platform (e.g., a network entity or element or unit that handles or manages the connectivity IoT SIMs), and/or by traffic profiling. For example, traffic profiling may be performed by monitoring device traffic to create and update a profile of the device behavior, such as which domain(s) it accesses on a regular basis, and then creating and updating a behavior profile database of various devices, which then enables to match a device to an existing device-profile; as a demonstrative example, a Tesla connected car may typically communicate with the domain "Tesla-Telemetry-Service.com", whereas a certain model of soda vending machines may communicate only with the domain "Best-Cola-Support.com", whereas the measuring units of an electricity company may communicate only with the domain "Local-Power-And-Light.com", and so forth; and accordingly, based on aggregation of data from multiple devices that access the same domain, a classification of IoT devices may be created with an accompanying profile, and detection of communication behavior that matches such profile may be used to identify the type of an IoT device.

The Sensor Unit 221 monitors and collects the following data for each of the endpoints identified as managed IoT devices, and/or for each data connection: (a) timestamp of start; (b) 5-tuple of the connections (e.g., source IP address, source port, destination IP address, destination port, protocol being used); (c) Identified protocols; (d) upstream volume of traffic; (e) downstream volume of traffic; (f) upstream packet count; (g) downstream packet count. The data is periodically collected (e.g., at pre-defined time intervals) by a Data Collector unit 211 (e.g., via C1 interface), and is stored in a repository therein.

An Analyzer unit 212 performs analysis of the collected data: (a) Network activity profiling, performed periodically (e.g., at pre-defined time intervals), by clustering the collected data (e.g., via Cd interface) using a pre-defined clustering mechanism or clustering algorithm (e.g., by utilizing K-Means, or other suitable clustering method); and performing extraction of features from the data-set, per class of IoT devices, wherein a class pertains to a set of IoT devices that belongs to the same IoT service or type (e.g., type of "vending machine", or type of "smoke detector"). (b)

Each new data point for a particular IoT device is compared to the cluster(s) of the class for that device; or, the features or characteristics of traffic pertaining to a particular IoT device, is compared to the features or characteristics that characterize the cluster of IoT devices of that type. (c) Outliers are detected and flagged as suspicious, for example, based on distance greater than a pre-defined threshold value, or based on other indicators for irregularity of values or ranges-of-values; and a notification is generated with regard to such flagged IoT device, e.g., for further manual and/or automatic handling, for initiating attack mitigation operations, for remote de-activation or remote pausing of the IoT device, or the like.

The flagged IoT devices or suspicious candidates are excluded from cluster K-Mean calculations; and are placed into a "deep observation mode" by instructing the Sensor Unit 221 (e.g., via In interface) to further monitor their network activity (e.g., optionally at shorter time-intervals or at a higher granularity or resolution). The deep observation mode may further include steering of HTTP traffic to inspection engines for Bot detection or infiltration; and/or detection of scanning attempts from the suspected IoT devices towards other internal hosts on the network or in the system.

The monitored network activity, and/or any output of the above operations, are for example: (a) Periodically collected by the Data Collector 211 (e.g., via C1 interface); and/or (b) Periodically analyzed by the Analyzer 212 (e.g., via Cd interface); and/or (c) Candidate IoT devices that exhibit malicious or defective or abnormal behavior are reported to a Policy component 213 (e.g., via Ac interface), and are placed into a quarantine, subject to configurable or pre-defined policy that is enforced by a Policy Enforcer component 222 (e.g., via En interface).

The following is a demonstrative example of detecting and/or mitigating a Distributed Denial-of-Service (DDoS) attack against a group of IP-connected cameras (or sensors, or devices) or other Internet-connected sensors or cameras or devices.

For example, 50,000 traffic cameras of a particular vendor (V) are deployed across a geographical area or a city or a state. Each camera has a cellular modem, and is connected to the Internet via a particular service provider (CSP-1). The cameras send video streams over the cellular connection to a particular content server residing on the Internet, allowing citizens to view traffic conditions in busy streets, intersection, highways, or the like.

Those IP-connected cameras are IoT devices, that hackers or attackers may attempt to compromise and/or exploit. For example, hackers wish to attack the public servers of "foobar-news.com" by a DDoS attack; they need a large set of "bots" or compromised devices, each device generating "legitimate" traffic against or towards the victim server(s) (e.g., "foobar-news.com") in a coordinated manner, while also maintaining the anonymity of the hackers.

The hackers scan the Internet for hosts or devices to infect, subvert and use as "bots" for the DDoS attack. They are familiar with vendor V's cameras, and know how to detect them and penetrate or compromise them (e.g., by abusing a known/un-patched vulnerability). They conduct a "slow scan", scanning the Internet from a central server to detect such vulnerable IP-connected cameras.

The hackers detect at least one camera in CSP-1's network. They exploit a known vulnerability in that vendor V camera, to obtain shell access with root privileges on that camera. The hackers transfer or install into the compromised camera a software module (malware) that allows them to control the camera remotely, and instruct the module to conduct scans as well as DDoS attacks. The malware module contacts the hackers' Command & Control (C&C) server. The hackers remotely instruct the infiltrated (compromised) camera to conduct additional scans, starting with the CSP-1 network; additional cameras are detected and infiltrated in the same manner; each infiltrated camera contacts the C&C server and registers for its use; the infiltrated cameras continue to conduct further scanning, and so forth. Subsequently, all or most or a large number of the IP cameras are infected and are in contact with the hackers' C&C server. On a given date and time, the attackers use the C&C server to instruct all infiltrated cameras to issue numerous and/or rapid and/or frequent HTTP requests versus or against or towards the server(s) of "foobar-news.com" at the same time, thus taking it down via a DDoS attack.

The system of the present invention may detect, prevent and/or mitigate such DDoS attack. For example, the system of the present invention monitors and observes traffic patterns of the 50,000 cameras, and automatically clusters them. While the cameras are in a "clean" state (non-infected, non-compromised), most of them will follow the same traffic pattern (e.g., transmitting video streams to the content server; occasionally having communication with the management server of the IoT service for status and for software updates). However, after the initial infection of one camera or of some cameras, the ongoing and dynamic traffic pattern clustering would show a change in the cluster, as more and more cameras are infected, conduct scanning, and are in touch with the C&C server. At some point in time, a significant (e.g., greater than N percent) of the cameras in the network would exhibit the changed pattern, or the irregular or abnormal traffic pattern (or various, multiple, irregular patterns or abnormal patterns) that is different from the regular pattern that was previously exhibited by non-infected cameras and/or by properly-functioning cameras. The system may search for these changes (changes in patterns/clustering) as they occur over time, and may flag the "growing shift" in pattern as an infection indication or as an indication that some or all IoT devices are compromised and/or are exhibiting irregular activity.

The discussion above was demonstrated in the context of a detecting IP-cameras that are infected by malware and/or that are compromised towards (or within) a DDoS attack. However, the present invention may similarly operate to detect, prevent and/or mitigate other irregular or abnormal or non-desired situations or conditions; for example, Vendor V has released a software update that is installed on thousands of IP-connected cameras, but also causes them to erroneously transmit large or larger amounts of data packets; the system of the present invention may detect such "patched" or "updated" cameras and may flag them as having abnormal activity, even if the reason for the irregular network activity was a legitimate (vendor supplied) yet defective patch, rather than an attacker's malware module.

In another example, due to "bug" (programming error) in the software or firmware of the cameras, thousands of cameras—that are neither compromised nor patched—suddenly begin to behave abnormally at a certain date-and-time, such as due to a stack overflow bug or due to a counter that breaches its pre-defined limits (e.g., similar to a Y2K bug); and the system of the present invention may detect and report such abnormal network activity that causes the multitude of cameras to behave in a defective or abnormal manner.

The present invention may operate by comparing a host (e.g., an IoT device) to other hosts (e.g., to other IoT devices) in its group or in its cluster of IoT devices (rather than merely comparing to a previous "baseline" profile of that device by itself) or having the same device-type. Infection or compromise or attack are detected as a function of mass behavior of numerous IoT devices, and not merely based on the particular change in pattern behavior of a particular host (IoT device), but based on the aggregated change exhibited by a group of hosts (IoT devise) that increases over time as the attackers infect more and more IoT devices. The present invention operates to perform the above features, utilizing to unique characteristics of IoT devices, such as, a large population of uniform devices, with similar communication pattern that can be clustered and that can be utilized for detection of outliers from the cluster; and the ability of the system to observe these devices in mass, or in the aggregate; and to combine clustering/inference with information that the system obtains from interaction with the provider's control plane (e.g., the system knows from the CSP-1 control plane (e.g., by IMSI, IP Range, etc.) that all those 50,000 subscribers are actually IoT devices (e.g., and not end-user cellular phones), and so they can be subjected to the above detection method).

For demonstrative purposes, some portions of the discussion herein may relate to an Internet-connected camera; however, other suitable IoT devices may be monitored and may be secured in accordance with the present invention, for example, various types of sensors, vending machines, alarm systems, detectors, smoke detectors, fire detectors, CO detectors, hazard detectors, or the like.

For demonstrative purposes, some portions of the discussion herein may relate to utilization of the system for the purpose of detecting a security breach of IoT device(s), or for detecting a DDoS attack that is being prepared or executed; however, the present invention may be used to achieve other and/or additional goals or results or benefits, for example, to detect other types of security breaches or attacks, to detect a malfunctioning or a non-functioning IoT device, or the like.

Figure 3:
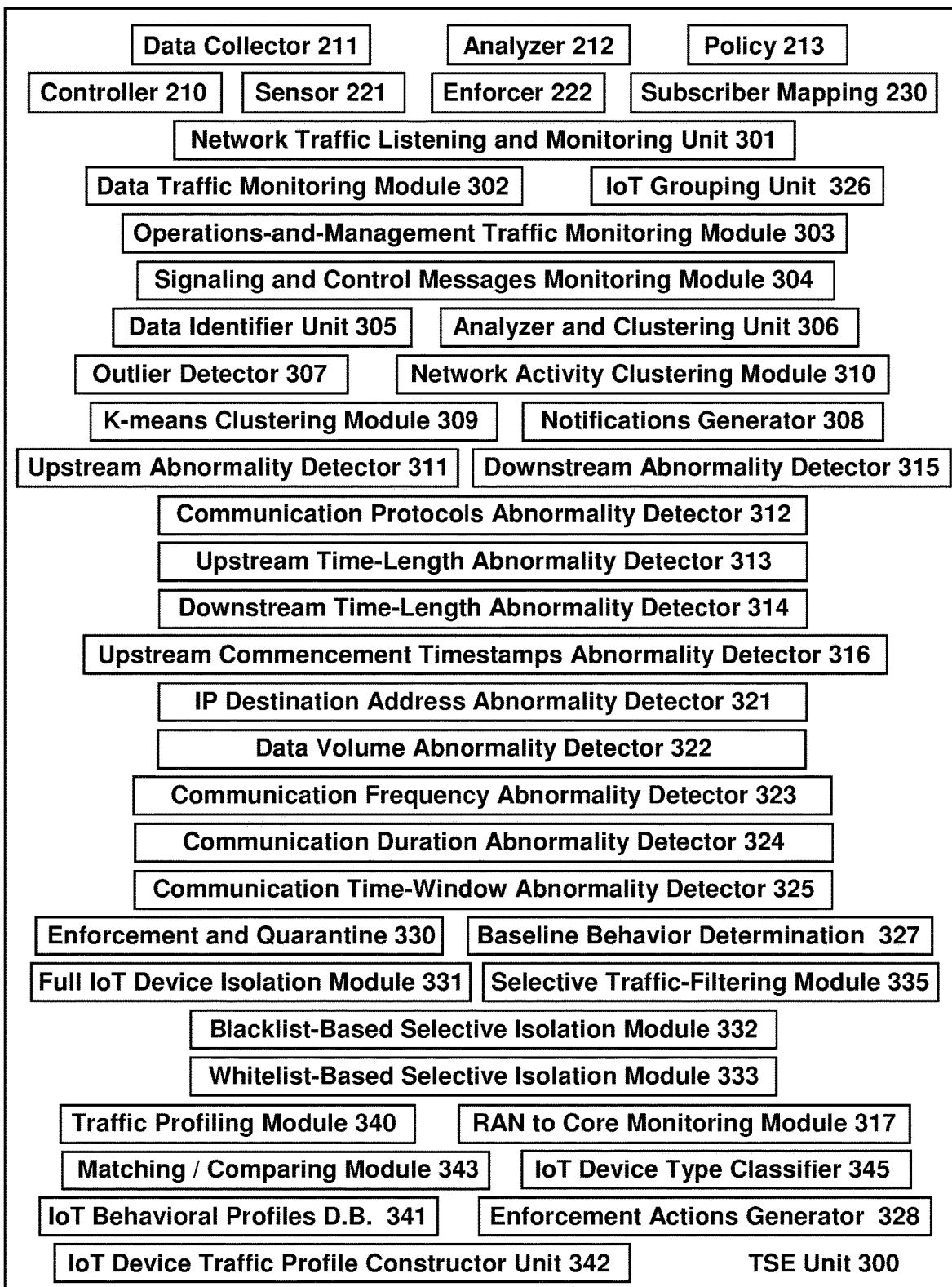
FIG. 3 is a schematic block-diagram illustration of a Traffic Sensing and Enforcement (TSE) unit, in accordance with some demonstrative embodiments of the present invention.

Reference is made to FIG. 3, which is a schematic block-diagram illustration of a Traffic Sensing and Enforcement (TSE) unit 300, in accordance with some demonstrative embodiments of the present invention. TSE unit 300 may be a demonstrative implementation of any of the TSE unit(s) that are discussed or described above. TSE unit 300 may be part of system 100 of FIG. 1, or may be a demonstrative implementation of TSE unit 106 of FIG. 1, or may be connected at other suitable location(s) within system 100 of FIG. 1. TSE unit 300 may be a demonstrative implementation of sub-system 200 of FIG. 2. In some embodiments, TSE unit 300 may optionally comprise one or more units or components or modules which are not necessarily depicted in FIG. 3 and which may be depicted in FIG. 1 and/or in FIG. 2, and/or other suitable components or modules that were discussed above or that are describe herein.

For example, as depicted in FIG. 3, the TSE unit 300 may comprise one or more of the components and/or modules of sub-system 200 of FIG. 2; such as, Data Collector unit 211; Analyzer unit 212; Policy component 213; Controller 210; Sensor 221; Enforcer 222; Subscriber Mapping unit 230 (or, an interface or connection to receive data from such subscriber mapping unit, or to send queries to such subscriber mapping unit).

TSE unit 300 may further comprise a network traffic listening and monitoring unit 301, to monitor (a) data traffic and (b) operations-and-management traffic and (c) control messages, that originate from an Internet of Things (IoT) device and are then exchanged between (i) a core network of a Cellular Service Provider (CSP), and (ii) the public Internet. The network traffic listening and monitoring unit 301 may optionally comprise (e.g., as sub-units or modules), or may be associated with, a Data Traffic monitoring module 302 to monitor data traffic; an Operations-and-Management Traffic Monitoring Module 303 to monitor operations-and-management traffic; and a Signaling and Control Messages Monitoring Module 304 to monitor signaling and/or to monitor control messages.

A Data Identifier Unit 305 may operate to identify within the monitored traffic and messages, based on cellular subscriber mapping information, particular network traffic that is exchanged between (a) Internet of Things (IoT) devices of a particular type, and (b) a recipient selected from the group consisting of: an IoT operations-and-management server, a server on the public Internet, a network element of said core network.

An Analyzer and Clustering Unit 306 may analyze said particular network traffic, and may characterize a cluster that represents a regular pattern of network traffic of said IoT devices of said particular type.

An Outlier Detector unit 307 may detect that a particular IoT device exhibits network traffic characteristics that are dissimilar relative to said cluster of regular pattern of network traffic of said particular type of IoT devices.

A Notifications Generator unit 308 may generate a notification or alarm or alert, that said particular IoT device is malfunctioning or is compromised, based on said dissimilar network traffic characteristics that are exhibited by said particular IoT device.

In some embodiments, the analyzer and clustering unit may comprise or may utilize a Clustering Module 309 (e.g., also referred herein for demonstrative purposes as K-means Clustering Module 309), which performs K-means clustering (or other type of clustering) of data-points representing network activity of each one of said IoT devices that belong to said particular type of IoT device. In some embodiments, these operations may optionally be performed by a Network Activity Clustering Module 310.

In some embodiments, the analyzer and clustering unit may comprise or may utilize a K-means Clustering Module 309, which may perform K-means clustering (or other type of clustering) of data-points representing upstream volume of traffic transmitted upstream by each one of said IoT devices that belong to said particular type of IoT device; such that the outlier detector detects that a particular IoT device exhibits upstream volume of traffic that is dissimilar relative to said cluster representing upstream volume of traffic of said particular type of IoT devices. In some embodiments, these operations may optionally be performed by an Upstream Abnormality Detector module 311.

In some embodiments, the analyzer and clustering unit may comprise or may utilize a K-means Clustering Module 309, which performs K-means clustering (or other type of clustering) of data-points representing downstream volume of traffic transmitted downstream towards each one of said IoT devices that belong to said particular type of IoT device; such that the outlier detector detects that a particular IoT device exhibits downstream volume of traffic that is dissimilar relative to said cluster representing upstream volume of traffic of said particular type of IoT devices. In some embodiments, these operations may optionally be performed by a Downstream Abnormality Detector module 315.

In some embodiments, the analyzer and clustering unit may comprise or may utilize a K-means Clustering Module 309, which performs K-means clustering (or other type of clustering) of data-points representing communication protocols that are utilized by each one of said IoT devices that belong to said particular type of IoT device; such that the outlier detector detects that a particular IoT device utilizes one or more communication protocols that are dissimilar relative to said cluster representing communication protocols that are used by said particular type of IoT devices. In some embodiments, these operations may optionally be performed by a Communication Protocols Abnormality Detector module 312.

In some embodiments, the analyzer and clustering unit may comprise or may utilize a K-means Clustering Module 309, which performs K-means clustering (or other type of clustering) of data-points representing time-length of upstream data transmissions by each one of said IoT devices that belong to said particular type of IoT device; such that the outlier detector detects that a particular IoT device exhibits time-lengths of upstream data transmissions that are dissimilar relative to said cluster representing time-length of upstream data transmissions by each one of said IoT devices of said particular type of IoT devices. In some embodiments, these operations may optionally be performed by an Upstream Time-Length Abnormality Detector module 313.

In some embodiments, the analyzer and clustering unit may comprise or may utilize a K-means Clustering Module 309, which performs K-means clustering (or other type of clustering) of data-points representing time-length of downstream data receptions towards each one of said IoT devices that belong to said particular type of IoT device; such that the outlier detector detects that a particular IoT device exhibits time-lengths of downstream data receptions that are dissimilar relative to said cluster representing time-length of downstream data transmissions towards each one of said IoT devices of said particular type of IoT devices. In some embodiments, these operations may optionally be performed by a Downstream Time-Length Abnormality Detector module 314.

In some embodiments, the analyzer and clustering unit may comprise or may utilize a K-means Clustering Module 309, which performs K-means clustering (or other type of clustering) of data-points representing commencement time-stamps of upstream data transmissions by each one of said IoT devices that belong to said particular type of IoT device; such that the outlier detector detects that a particular IoT device exhibits commencement time-stamps of upstream data transmissions that are dissimilar relative to said cluster representing commencement time-stamps of upstream data transmissions by each one of said IoT devices of said particular type of IoT devices. In some embodiments, these operations may optionally be performed by an Upstream Commencement Timestamps Abnormality Detector module 316.

In some embodiments, the analyzer and clustering unit further takes into account monitored traffic that is exchanged between (i) a Radio Access Network (RAN) and (ii) said core network of said CSP; for example, obtained or received or monitored or tracked via a RAN to Core Monitoring Module 317, or other suitable module or interface.

In some embodiments, an Internet Protocol (IP) destination address abnormality detector 321 may operate (i) to determine that a particular IoT device belongs to a particular type of IoT devices, (ii) to determine that said particular type of IoT devices typically communicate only with a single particular IP destination address, (iii) to determine that said particular IoT device communicates with another IP destination address, and (iv) to determine that said IoT device is malfunctioning or compromised.

In some embodiments, the Internet Protocol (IP) destination address abnormality detector 321 may operate (i) to determine that a particular IoT device belongs to a particular type of IoT devices, (ii) to determine that said particular type of IoT devices typically communicates only with a pre-defined set of particular IP destination addresses, (iii) to determine that said particular IoT device communicates with another IP destination address that is not in said pre-defined set of particular IP destination addresses, and (iv) to determine that said IoT device is malfunctioning or compromised.

In some embodiments, a Data Volume Abnormality Detector 322 may operate (i) to determine that a particular IoT device belongs to a particular type of IoT devices, (ii) to determine that said particular type of IoT devices typically communicate by sending a particular data volume per time-unit, (iii) to determine that said particular IoT device communicates by sending another data volume per time-unit, and (iv) to determine that said IoT device is malfunctioning or compromised.

In some embodiments, a Communication Frequency Abnormality Detector 323 may operate (i) to determine that a particular IoT device belongs to a particular type of IoT devices, (ii) to determine that said particular type of IoT devices typically communicates with remote destinations up to N times per time-unit, wherein N is a positive number; (iii) to determine that said particular IoT device communicates with remote destinations more than N times per time-unit, and (iv) to determine that said IoT device is malfunctioning or compromised.

In some embodiments, a Communication Duration Abnormality Detector 324 may operate (i) to determine that a particular IoT device belongs to a particular type of IoT devices, (ii) to determine that said particular type of IoT devices typically communicates with remote destinations by communication sessions that have time-length of up to M time-units, wherein M is a positive number; (iii) to determine that said particular IoT device communicates with a remote destination by at least one communication session that has time-length greater than M time-units, and (iv) to determine that said IoT device is malfunctioning or compromised.

In some embodiments, the communication protocols abnormality detector 312 ma operate (i) to determine that a particular IoT device belongs to a particular type of IoT devices, (ii) to determine that said particular type of IoT devices typically communicates with remote destinations by utilizing a first particular communication protocol, (iii) to determine that said particular IoT device communicates with a remote destination by at least one communication session that utilizes a communication protocol that is different from said first particular communication protocol, and (iv) to determine that said IoT device is malfunctioning or compromised.

In some embodiments, a Communication Time-Window Abnormality Detector 325 may operate (i) to determine that a particular IoT device belongs to a particular type of IoT devices, (ii) to determine that said particular type of IoT devices typically communicates with remote destinations only at a particular time-window of a day, (iii) to determine that said particular IoT device communicates with a remote destination at a time-point that is outside of said particular time-window, and (iv) to determine that said IoT device is malfunctioning or compromised.

In some embodiments, an Excessive Communications Detector may operate (i) to determine that a particular IoT device belongs to a particular type of IoT devices, (ii) to determine that said particular type of IoT devices typically communicates with one or more remote destinations up to P times per day, wherein P is a positive number; (iii) to determine that said particular IoT device communicates with one or more remote destinations more than P times per day, and (iv) to determine that said IoT device is malfunctioning or compromised.

In some embodiments, an Enforcement and Quarantine Unit 330, upon detection that said particular IoT device is malfunctioning or compromised, activates or operates a Full IoT Device Isolation Module 331 (i) to block relaying of all traffic that is outgoing from said particular IoT device to all destinations, and also (ii) to block relaying of all traffic that is incoming to said particular IoT device from all senders.

In some embodiments, for example, an enforcement and quarantine unit 330 determines that a smoke detector, that typically communicates only at 3:00 AM for up to 20 seconds by sending a fixed-size message of 640 bytes to a destination IP address that corresponds to "Smoke-Detectors-Company.com", exhibits abnormal behavior, such as, it sends every four hours a varying-size message of between 47 kilobytes to 58 kilobytes to a destination IP address that corresponds to "Hackerz-Unite-Server.com". Accordingly, the enforcement and quarantine unit 330 may put "Smoke-Detectors-Company.com" and/or its corresponding IP address(es) into a whitelist of destinations and senders that the smoke detector is authorized to communicate with. Similarly, the enforcement and quarantine unit 330 may put "Hackerz-Unite-Server.com" and/or its corresponding IP address(es) into a blacklist of destinations and senders that the smoke detector is unauthorized to communicate with. Then, full blocking, or partial blocking or selective blocking, of traffic to or from the compromised or malfunctioning IoT device, is applied based on such whitelist and/or blacklist; such as, by discarding or blocking or dropping or non-delivering or stopping (or erasing in transit) packets or messages or signals that are directed from the IoT device to a destination on the blacklist, or that are directed from a sender on the blacklist towards the IoT device; and/or by allowing passage and/or relaying and/or forwarding and/or delivering packets or messages or signals that are directed from the IoT device to a destination on the whitelist, or that are directed from a sender on the whitelist towards the IoT device.

In some embodiments, the enforcement and quarantine unit 330, upon detection that said particular IoT device is malfunctioning or compromised, activates or operates a Blacklist-Based Selective Isolation Module 332 (i) to define a blacklist of network destinations and network senders that said particular IoT device is not authorized to communicate with, and (ii) to selectively block relaying of all traffic that is outgoing from said particular IoT device to one or more particular destinations that are in said blacklist, and also (iii) to selectively block relaying of all traffic that is incoming to said particular IoT device from one or more particular senders that are in said blacklist.

In some embodiments, the enforcement and quarantine unit 330, upon detection that said particular IoT device is malfunctioning or compromised, activates or operates a Whitelist-Based Selective Isolation Module 333 (i) to define a whitelist of network destinations and network senders that only with them said particular IoT device is authorized to communicate, and (ii) to selectively block relaying of all traffic that is outgoing from said particular IoT device to one or more particular destinations that are not in said whitelist, and also (iii) to selectively block relaying of all traffic that is incoming to said particular IoT device from one or more particular senders that are not in said whitelist.

It is noted that the above modules, such as the Blacklist-Based Selective Isolation Module 332 and/or Whitelist-Based Selective Isolation Module 333, are non-limiting examples; and other suitable selective quarantine modules or selective isolation modules or selective traffic-filtering modules may be used, optionally as part of a Selective Traffic-Filtering Module 335 or other suitable unit or component.

TSE unit 300 may further comprise, optionally, a Traffic Profiling Module 340 able to perform the traffic profiling operations that were described above; and may operate in conjunction with, and may update information in, a IoT Devices Behavioral Profiles Database 341 which stores behavioral profiles indicating characteristic of the network activity that is typical and/or is common and/or is authorized for a particular type of IoT devices (e.g., smoke detector; vending machine; electricity meter). Optionally, in the traffic profiling process, an IoT Device Traffic Profile Constructor Unit 342 may dynamically construct a network activity behavior profile for each IoT device that is monitored; such profiles are then compared or matched, via a Matching/Comparing Module 343 to the IoT Devices Behavioral Profiles Database 341, in order to determine whether a particular IoT device, based on the sensed characteristics of its network activity, matches the behavioral profile of network activity of IoT devices of this type, or exhibits abnormal network activity and is thus suspected to be compromised or malfunctioning.

Optionally, an IoT Device Type Classifier 345 may operate in conjunction with one or more of the above-mentioned modules or units, for example, to classify a particular IoT device into a Type of IoT devices (e.g., smoke detectors; vending machines; electricity meters) based on a match between (i) the exhibited network activity of that particular IoT device and (ii) the typical network activity of IoT devices of this type as reflected in their behavioral profile. The classification may further be used, subsequently, in order to determine whether a newly-sensed or newly-captured network activity or network behavior, is within the typical or common or allowed network activity behaviors for that Type of IoT devices, thereby determining that the IoT device does not appear to be compromised or malfunctioning; or conversely, to determine whether a newly-sensed or newly-captured network activity or network behavior, is not within the typical or common or allowed network activity behaviors for that Type of IoT devices, thereby determining that the IoT device appears to be compromised or malfunctioning.

In some embodiments, optionally, the Analyzer and Clustering Unit 306 (or other analysis/clustering modules as described), may operate based on, or by taking into account, TCP/IP packets, PDP packets, post PGW traffic, pre PGW traffic, post SGW traffic, pre SGW traffic, pre eNodeB traffic, post eNodeB traffic, RAN traffic, Core Network traffic or packets, RAN to Core Network traffic or signaling or messages; headers, payloads, signals of communication items; as well as signaling and/or control messages exchanged by or received by or sent by any of the above. In some embodiments, optionally, the Analyzer and Clustering Unit 306 (or other analysis/clustering modules as described), may operate based on, or by taking into account, PGW output, PGW input, PGW relayed, SGW output, SGW input, RAN output, RAN input, Core Network output, Core Network input, eNodeB input, eNodeB output; as well as signaling and/or control messages exchanged by or received by or sent by any of the above.

In some embodiments of the present invention, a system comprises: a network traffic monitoring unit 301, to monitor at least one of: (a) data traffic, (b) operations-and-management traffic, (c) control messages, that relate to cellular communication between (I) an Internet of Things (IoT) device and (II) a core network of a Cellular Service Provider (CSP); an IoT grouping unit 326, to group multiple IoT devices into a particular IoT group, based on at least one of: (A) pre-defined data that indicates that said multiple IoT devices belong to a same entity (e.g., to a same owner entity); (B) pre-defined data that indicates that said multiple IoT devices are operated by a same entity (e.g., to a same operator entity; wherein operator in this context is not necessarily a Cellular Network Operator, but rather, is an entity that operates a specific group of IoT devices on behalf of a particular customer or client, such as, for example, a security firm that operates a set of IP cameras or IP sensors on behalf of a client or a customer)); (C) dynamically generated data that indicates that said multiple devices exhibit same communication pattern over a particular time-period; a baseline behavior determination unit 327, to determine a Regular Baseline Cellular Communication Behavior (RBCCB) profile that characterizes the cellular communications that are outgoing from and incoming to each member of said particular IoT group; an outlier detector 307, to subsequently detect that a particular IoT device of said particular IoT group, exhibits cellular traffic characteristics that are abnormal relative to the RBCCB profile that was characterized for said particular IoT group; an enforcement actions generator 328, to perform or to generate or to trigger or to initiate one or more enforcement operations or response actions with regard to said particular IoT device which exhibits cellular traffic characteristics that are abnormal relative to the RBCCB profile that was characterized for said particular IoT group.

In some embodiments, the network traffic monitoring unit is to monitor: (a) data traffic, and also, at least one of: (b) operations-and-management traffic, and (c) control messages, that relate to cellular communication between (I) said Internet of Things (IoT) device and (II) the core network of the Cellular Service Provider (CSP).

In some embodiments, the IoT grouping unit is to group said multiple IoT devices into said particular IoT group, based on a list of International Mobile Subscriber Identity (IMSI) strings that is obtained or received from an owner or operator of said multiple IoT devices. For example, an owner or operator of a group of 150 smoke detectors, provides a list of IMSI strings of these particular devices; which are then grouped into one IoT group based on their IMSI strings belonging to this list.

In some embodiments, the IoT grouping unit is to group said multiple IoT devices into said particular IoT group, based on a list of one or more Mobile Station International Subscriber Director Number (MSISDN) strings and/or International Mobile Equipment Identity (IMEI) strings, that is obtained or received from an owner or operator of said multiple IoT devices. For example, an owner or operator of a group of 150 smoke detectors, provides a list of MSISDN and/or IMEI strings of these particular devices; which are then grouped into one IoT group based on their MSISDN or IMEI strings belonging to this list.

In some embodiments, the IoT grouping unit is to group said multiple IoT devices into said particular IoT group, based on at least one list out of: (i) list of device provisioning data, (ii) list of device serialization data, that is obtained or received from an owner or operator of said multiple IoT devices.

In some embodiments, the IoT grouping unit is to group said multiple IoT devices into said particular IoT group, based on at least detection of a same user-agent string in HTTP requests sent by each one of said multiple IoT devices.

In some embodiments, the IoT grouping unit is to group said multiple IoT devices into said particular IoT group, based on at least detection that each one of said IoT devices, sends exactly M bytes of data every T hours, and receives exactly N bytes of data every T hours; wherein M, N and T are pre-defined threshold values. The IoT grouping unit may utilize, for this purpose and for other purposes described herein, one or more units or modules that measure or count bytes or packets or data-items that are sent by and/or received from an IoT device, in conjunction with a timer or a timing unit that monitors the passage of time, thereby enabling determination of the number or size of transmissions/receptions in a specific time-period or time-slot or time-window by each such IoT device.

In some embodiments, the IoT grouping unit is to group said multiple IoT devices into said particular IoT group, based on at least detection that each one of said IoT devices: (I) sends every T hours cellular data having total volume in the range of between M1 to M2 bytes; and (II) receives every T hours cellular data having total volume in the range of between N1 to N2 bytes; wherein M1, M2, N1, N2 and T are pre-defined threshold values.

In some embodiments, the IoT grouping unit is to group said multiple IoT devices into said particular IoT group, based on at least detection that each one of said IoT devices sends outgoing cellular data only to a same single particular destination (e.g., to the same single destination of RemoteServer.ExampleDomain.com), not more than one time every T minutes; wherein T is a pre-defined threshold value; or, to a same batch of similar or generally-similar or sufficiently-similar destinations or external entities (e.g., some IoT devices send data to RemoteServer.ExampleDomain.com, whereas some other IoT devices send data to DataCollector.ExampleDomain.com, and some other IoT devices send data to DataReceiver.ExampleDomain.com; or the like, indicating similarity of the recipient destinations due to having the same domain name, and thereby enabling the IoT grouping unit to group them together even if they do not send data to the same exact destination but rather to sufficiently-similar destinations, wherein the sufficient similarity is determined based on pre-defined criteria or conditions as demonstrated above with regard to having the same Domain name in all such similar destinations).

In some embodiments, the IoT grouping unit is to group said multiple IoT devices into said particular IoT group, based on at least detection that each one of said IoT devices receives incoming cellular data only from a same or similar single remote entity (or, from a set or batch of sufficiently-similar or otherwise correlated remote entities, as demonstrated above), not more than one time every T minutes; wherein T is a pre-defined threshold value.

In some embodiments, the IoT grouping unit is to group said multiple IoT devices into said particular IoT group, based on at least detection of a particular repeating pattern of outgoing and incoming cellular communication operations that each one of said IoT devices performs repeatedly over a pre-defined time period. This may optionally be performed by a pattern detector module or unit, which may be part of the IoT grouping unit or may operate in conjunction therewith, and which may detect or determine that a particular or sufficiently-similar pattern exists with regard to incoming and/or outgoing communications of two or more IoT devices.

In some embodiments, the baseline behavior determination unit is to generate said RBCCB profile of said particular IoT group, by performing analysis of both (i) cellular traffic data of each one of said multiple IoT devices, and (ii) meta-data about cellular communications of each one of said multiple IoT devices.

In some embodiments, the baseline behavior determination unit is to generate said RBCCB profile of said particular IoT group, by performing analysis of both (i) cellular traffic data of each one of said multiple IoT devices, and (ii) meta-data about cellular communications of each one of said multiple IoT devices; wherein said analysis determines: (A) a maximum volume of outgoing cellular traffic that is outgoing from a member of said particular IoT group within a pre-defined time-period; and (B) a minimum volume of outgoing cellular traffic that is outgoing from a member of said particular IoT group within a pre-defined time-period.

In some embodiments, the baseline behavior determination unit is to generate said RBCCB profile of said particular IoT group, by performing analysis of both (i) cellular traffic data of each one of said multiple IoT devices, and (ii) meta-data about cellular communications of each one of said multiple IoT devices; wherein said analysis determines: (A) a maximum volume of incoming cellular traffic that is incoming to a member of said particular IoT group within a pre-defined time-period; and (B) a minimum volume of incoming cellular traffic that is incoming to a member of said particular IoT group within a pre-defined time-period.

In some embodiments, the baseline behavior determination unit is to generate said RBCCB profile of said particular IoT group, which indicates at least: (a) a maximum total volume of outgoing cellular traffic that a member of said particular IoT group is allowed to send within a pre-defined time period; and (b) a maximum number of outgoing cellular transmissions that a member of said particular IoT group is allowed to send within a pre-defined time period.

In some embodiments, the baseline behavior determination unit is to generate said RBCCB profile of said particular IoT group, based on an obtained list of cellular communications threshold values and threshold ranges that a member of said particular IoT group is allowed to perform within a pre-defined time-period.

In some embodiments, the baseline behavior determination unit is to update said RBCCB profile of said particular IoT group, based on an indication or an identification that members of said particular IoT group received a firmware update or a security patch. This may enable the system to later reduce or eliminate a "false positive" decision with regard to IoT devices that received such update or patch, which legitimately caused them to modify their communications pattern (e.g., due to the update or upgrade or patch, each IoT device now legitimately sends 326 bytes every hour, instead of previously sending only 241 bytes every three hours).

In some embodiments, the baseline behavior determination unit is to determine said RBCCB based at least on clustering of data-points representing the number of outgoing cellular transmissions that are transmitted by each one of said multiple IoT devices within a pre-defined time-period. The clustering described above or herein, may be based on K-means clustering, and/or on other suitable types of clustering methods; and may be based on a single type of data-points or on multiple types of data-points (e.g., multiple features) that are evaluated together for clustering purposes.

In some embodiments, the baseline behavior determination unit is to determine said RBCCB based at least on clustering of data-points representing the number of incoming cellular receptions that are received by each one of said multiple IoT devices within a pre-defined time-period.

In some embodiments, the baseline behavior determination unit is to determine said RBCCB based at least on clustering of data-points representing the total upstream volume of outgoing cellular transmissions that are transmitted by each one of said multiple IoT devices within a pre-defined time-period.

In some embodiments, the baseline behavior determination unit is to determine said RBCCB based at least on clustering of data-points representing the total downstream volume of incoming cellular receptions that are received by each one of said multiple IoT devices within a pre-defined time-period.

In some embodiments, the baseline behavior determination unit is to determine said RBCCB based at least on clustering of data-points representing the time-length of upstream cellular transmissions that are transmitted by each one of said multiple IoT devices within a pre-defined time-period.

In some embodiments, the baseline behavior determination unit is to determine said RBCCB based at least on clustering of data-points representing the time-length of downstream cellular receptions that are received by each one of said multiple IoT devices within a pre-defined time-period.

In some embodiments, the baseline behavior determination unit is to determine said RBCCB based at least on clustering of data-points representing particular types of communication protocols that are utilized for upstream cellular transmissions by each one of said multiple IoT devices within a pre-defined time-period.

In some embodiments, the baseline behavior determination unit is to determine said RBCCB based at least on clustering of Deep Packet Inspection (DPI) data-points representing particular types of applications generate upstream cellular transmissions by each one of said multiple IoT devices within a pre-defined time-period.

In some embodiments, the baseline behavior determination unit is to generate said RBCCB profile which indicates that all members of said particular IoT group send upstream cellular transmissions only to a single particular Internet Protocol (IP) destination address; wherein the outlier detector comprises an Internet Protocol (IP) destination address abnormality detector, (i) to determine that said particular IoT device sends one or more upstream cellular transmissions to another IP destination address, and (ii) to determine that said particular IoT device is malfunctioning or compromised.

In some embodiments, the baseline behavior determination unit is to generate said RBCCB profile which indicates that all members of said particular IoT group receive downstream cellular transmissions only from a single particular Internet Protocol (IP) originating address; wherein the outlier detector comprises an Internet Protocol (IP) originating address abnormality detector, (i) to determine that said particular IoT device receives one or more downstream cellular communications from another IP destination address, and (ii) to determine that said particular IoT device is malfunctioning or compromised.

In some embodiments, the baseline behavior determination unit is to generate said RBCCB profile which indicates that all members of said particular IoT group send upstream cellular transmissions only to a particular set of Internet Protocol (IP) destination addresses; wherein the outlier detector comprises an Internet Protocol (IP) destination address abnormality detector, (i) to determine that said particular IoT device sends one or more upstream cellular transmissions to another IP destination address which is not in said particular set of IP destination addresses, and (ii) to determine that said particular IoT device is malfunctioning or compromised.

In some embodiments, the baseline behavior determination unit is to generate said RBCCB profile which indicates that all members of said particular IoT group receive downstream cellular transmissions only from a particular set of Internet Protocol (IP) originating addresses; wherein the outlier detector comprises an Internet Protocol (IP) originating address abnormality detector, (i) to determine that said particular IoT device receives one or more downstream cellular communications from another IP destination address that is not in said particular set of IP originating addresses, and (ii) to determine that said particular IoT device is malfunctioning or compromised.

In some embodiments, the baseline behavior determination unit is to generate said RBCCB profile which indicates that each upstream cellular transmission, that is typically performed by each member of said particular IoT group, has a total length of between M1 to M2 bytes, wherein M1 and M2 are pre-defined threshold values; wherein the outlier detector comprises a data volume abnormality detector, (i) to determine that said particular IoT device sends at least one upstream cellular transmission that has a total length which is not between M1 to M2 bytes, and (ii) to determine that said particular IoT device is malfunctioning or compromised.

In some embodiments, the baseline behavior determination unit is to generate said RBCCB profile which indicates that each downstream cellular transmission, that is typically received by each member of said particular IoT group, has a total length of between M1 to M2 bytes, wherein M1 and M2 are pre-defined threshold values; wherein the outlier detector comprises a data volume abnormality detector, (i) to determine that said particular IoT device receives at least one downstream cellular transmission that has a total length which is not between M1 to M2 bytes, and (ii) to determine that said particular IoT device is malfunctioning or compromised.

In some embodiments, the baseline behavior determination unit is to generate said RBCCB profile which indicates that each member of said particular IoT group, sends out between N1 and N2 discrete cellular transmissions within a time-period of T hours, wherein N1 and N2 and T are pre-defined threshold values; wherein the outlier detector comprises a communication frequency abnormality detector, (i) to determine that said particular IoT device sends out D discrete cellular transmissions within T hours, wherein D is not between N1 to N2 bytes, and (ii) to determine that said particular IoT device is malfunctioning or compromised.

In some embodiments, the baseline behavior determination unit is to generate said RBCCB profile which indicates that each member of said particular IoT group, establishes between N1 and N2 core network connection requests per T hours, wherein N1 and N2 and T are pre-defined threshold values; wherein the outlier detector comprises a communication frequency abnormality detector, (i) to determine that said particular IoT device establishes R core network connection requests per T hours, wherein D is not between N1 to N2, and (ii) to determine that said particular IoT device is malfunctioning or compromised.

In some embodiments, the baseline behavior determination unit is to generate said RBCCB profile which indicates that each upstream cellular transmission, that is typically performed by each member of said particular IoT group, has a total time-duration of between M1 to M2 seconds, wherein M1 and M2 are pre-defined threshold values; wherein the outlier detector comprises a time-duration abnormality detector, (i) to determine that said particular IoT device sends at least one upstream cellular transmission that has a total time-duration which is not between M1 to M2 seconds, and (ii) to determine that said particular IoT device is malfunctioning or compromised.

In some embodiments, the baseline behavior determination unit is to generate said RBCCB profile which indicates that each upstream cellular transmission, that is typically performed by each member of said particular IoT group, is performed using a particular communication protocol; wherein the outlier detector comprises a communication protocol abnormality detector, (i) to determine that said particular IoT device sends at least one upstream cellular transmission using another communication protocol, and (ii) to determine that said particular IoT device is malfunctioning or compromised.

In some embodiments, the baseline behavior determination unit is to generate said RBCCB profile which indicates that each upstream cellular transmission, that is typically performed by each member of said particular IoT group, is performed by a particular application running on each member of said particular IoT group; wherein the outlier detector comprises an application abnormality detector, (i) to determine that said particular IoT device sends at least one upstream cellular transmission via another application running on said particular IoT device, and (ii) to determine that said particular IoT device is malfunctioning or compromised.

In some embodiments, the baseline behavior determination unit is to generate said RBCCB profile which indicates that each upstream cellular transmission, that is typically performed by each member of said particular IoT group, is performed by a particular application running on each member of said particular IoT group; wherein the outlier detector comprises an application abnormality detector, (i) to determine based on Deep Packet Inspection (DPI) analysis that said particular IoT device sends at least one upstream cellular transmission via another application running on said particular IoT device, and (ii) to determine that said particular IoT device is malfunctioning or compromised.

In some embodiments, the baseline behavior determination unit is to generate said RBCCB profile which indicates that each upstream cellular transmission, that is typically performed by each member of said particular IoT group, is performed within a particular time-window; wherein the outlier detector comprises a communication time-window abnormality detector, (i) to determine that said particular IoT device sends at least one upstream cellular transmission during a time-slot that is outside of said particular time-window, and (ii) to determine that said particular IoT device is malfunctioning or compromised.

In some embodiments, the baseline behavior determination unit is to generate said RBCCB profile which indicates that each member of said particular IoT group, performs up to N upstream cellular transmissions per day; wherein the outlier detector comprises an excessive communications detector, (i) to determine that said particular IoT device performs more than N upstream cellular transmissions per day, and (ii) to determine that said particular IoT device is malfunctioning or compromised.

In some embodiments, the baseline behavior determination unit is to generate said RBCCB profile based on a previously-obtained or previously-prepared database which stores data indicating baseline cellular communication rules that pertain to different types of IoT devices.

In some embodiments, the baseline behavior determination unit is to dynamically update said RBCCB profile of said particular IoT group, based on continued Machine Learning (ML) of traffic-related behavior of members of said particular IoT group.

In some embodiments, the outlier detector is: (i) to detect that said particular IoT device exhibits cellular communication activity that is sufficiently dissimilar, beyond a pre-defined threshold of dissimilarity, from said RBCCB profile of said particular IoT group, and (ii) to trigger said enforcement actions generator to perform one or more enforcement operations with regard to said particular IoT device.

In some embodiments, the outlier detector is: (i) to detect that said particular IoT device exhibits cellular communication activity that is sufficiently dissimilar, beyond a pre-defined threshold of dissimilarity, from said RBCCB profile of said particular IoT group, and (ii) to detect that there exists an authorized cause for said cellular communication activity, and (iii) to determine that said cellular communication activity is a false positive, and to avoid triggering of said enforcement actions generator.

In some embodiments, the enforcement actions generator is to send a notification, to an owner or an operator of said particular IoT group, indicating (i) an identifier of said particular IoT device, and (ii) an indication that said particular IoT device is malfunctioning or compromised.

In some embodiments, the enforcement actions generator is to quarantine all cellular traffic that is sent from said particular IoT device.

In some embodiments, the enforcement actions generator is to quarantine all cellular traffic that is directed to said particular IoT device.

In some embodiments, the enforcement actions generator is to quarantine all cellular traffic that is directed to said particular IoT device, except for cellular traffic that originates from a genuine owner of said IoT device (e.g., as pre-defined in the system, for example, based on a list that indicates identifiers of IoT devices and their respective legitimate owner or genuine owner).

In some embodiments, upon detection that said particular IoT device is malfunctioning or compromised, the enforcement actions generator activates a blacklist-based selective quarantine module (i) to define a blacklist of network destinations and network senders that said particular IoT device is not authorized to communicate with, and (ii) to selectively block relaying of all cellular traffic that is outgoing from said particular IoT device to one or more particular destinations that are in said blacklist, and also (iii) to selectively block relaying of all cellular traffic that is incoming to said particular IoT device from one or more particular senders that are in said blacklist.

In some embodiments, upon detection that said particular IoT device is malfunctioning or compromised, the enforcement actions generator activates a whitelist-based selective quarantine module (i) to define a whitelist of network destinations and network senders that only with them said particular IoT device is authorized to communicate, and (ii) to selectively block relaying of all cellular traffic that is outgoing from said particular IoT device to one or more particular destinations that are not in said whitelist, and also (iii) to selectively block relaying of all cellular traffic that is incoming to said particular IoT device from one or more particular senders that are not in said whitelist.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
    a network traffic monitoring unit, to monitor at least one of: (a) data traffic, (b) operations-and-management traffic, (c) control messages, that relate to cellular communication between (I) an Internet of Things (IoT) device and (II) a core network of a Cellular Service Provider (CSP);
    an IoT grouping unit, to group multiple IoT devices into a particular IoT group, based on at least one of: (A) pre-defined data that indicates that said multiple IoT devices belong to a same entity; (B) pre-defined data that indicates that said multiple IoT devices are operated by a same entity; (C) dynamically generated data that indicates that said multiple devices exhibit same communication pattern over a particular time-period;
    a baseline behavior determination unit, to determine a Regular Baseline Cellular Communication Behavior (RBCCB) profile that characterizes the cellular communications that are outgoing from and incoming to each member of said particular IoT group;
    an outlier detector, to subsequently detect that a particular IoT device of said particular IoT group, exhibits cellular traffic characteristics that are abnormal relative to the RBCCB profile that was characterized for said particular IoT group;
    wherein the outlier detector comprises a communication protocols abnormality detector, (I) to determine that said particular IoT device belongs to a particular type of IoT devices, (II) to determine that said particular type of IoT devices typically communicates with remote destinations by utilizing a first particular communication protocol, (III) to determine that said particular IoT device communicates with a remote destination by at least one communication session that utilizes a communication protocol that is different from said first particular communication protocol, and (IV) to determine that said particular IoT device is malfunctioning or compromised;
    an enforcement actions generator, to perform one or more enforcement operations with regard to said particular IoT device which exhibits cellular traffic characteristics that are abnormal relative to the RBCCB profile that was characterized for said particular IoT group.

2. The system of claim 1,
    wherein the network traffic monitoring unit is to monitor: (a) data traffic, and also, at least one of: (b) operations-and-management traffic, and (c) control messages, that relate to cellular communication between (I) said Internet of Things (IoT) device and (II) the core network of the Cellular Service Provider (CSP).

3. The system of claim 1,
wherein the IoT grouping unit is to group said multiple IoT devices into said particular IoT group, based on a list of International Mobile Subscriber Identity (IMSI) strings that is obtained or received from an owner or operator of said multiple IoT devices.

4. The system of claim 1,
wherein the IoT grouping unit is to group said multiple IoT devices into said particular IoT group, based on a list of one or more Mobile Station International Subscriber Directory Number (MSISDN) strings and/or International Mobile Equipment Identity (IMEI) strings, that is obtained or received from an owner or operator of said multiple IoT devices.

5. The system of claim 1,
wherein the IoT grouping unit is to group said multiple IoT devices into said particular IoT group, based on at least one list out of: (i) list of device provisioning data, (ii) list of device serialization data, that is obtained or received from an owner or operator of said multiple IoT devices.

6. The system of claim 1,
wherein the IoT grouping unit is to group said multiple IoT devices into said particular IoT group, based on at least detection of a same user-agent string in HTTP requests sent by each one of said multiple IoT devices.

7. The system of claim 1,
wherein the IoT grouping unit is to group said multiple IoT devices into said particular IoT group, based on at least detection that each one of said IoT devices, sends exactly M bytes of data every T hours, and receives exactly N bytes of data every T hours; wherein M, N and T are pre-defined threshold values.

8. The system of claim 1,
wherein the IoT grouping unit is to group said multiple IoT devices into said particular IoT group, based on at least detection that each one of said IoT devices: (I) sends every T hours cellular data having total volume in the range of between M1 to M2 bytes; and (II) receives every T hours cellular data having total volume in the range of between N1 to N2 bytes; wherein M1, M2, N1, N2 and T are pre-defined threshold values.

9. The system of claim 1,
wherein the IoT grouping unit is to group said multiple IoT devices into said particular IoT group, based on at least detection that each one of said IoT devices sends outgoing cellular data only to a same or similar single particular destination, not more than one time every T minutes; wherein T is a pre-defined threshold value.

10. The system of claim 1,
wherein the IoT grouping unit is to group said multiple IoT devices into said particular IoT group, based on at least detection that each one of said IoT devices receives incoming cellular data only from a same or similar single remote entity, not more than one time every T minutes; wherein T is a pre-defined threshold value.

11. The system of claim 1,
wherein the IoT grouping unit is to group said multiple IoT devices into said particular IoT group, based on at least detection of a particular repeating pattern of outgoing and incoming cellular communication operations that each one of said IoT devices performs repeatedly over a pre-defined time period.

12. The system of claim 1,
wherein the baseline behavior determination unit is to generate said RBCCB profile of said particular IoT group, by performing analysis of both (i) cellular traffic data of each one of said multiple IoT devices, and (ii) meta-data about cellular communications of each one of said multiple IoT devices.

13. The system of claim 1,
wherein the baseline behavior determination unit is to generate said RBCCB profile of said particular IoT group, by performing analysis of both (i) cellular traffic data of each one of said multiple IoT devices, and (ii) meta-data about cellular communications of each one of said multiple IoT devices;
wherein said analysis determines: (A) a maximum volume of outgoing cellular traffic that is outgoing from a member of said particular IoT group within a pre-defined time-period; and (B) a minimum volume of outgoing cellular traffic that is outgoing from a member of said particular IoT group within a pre-defined time-period.

14. The system of claim 1,
wherein the baseline behavior determination unit is to generate said RBCCB profile of said particular IoT group, by performing analysis of both (i) cellular traffic data of each one of said multiple IoT devices, and (ii) meta-data about cellular communications of each one of said multiple IoT devices;
wherein said analysis determines: (A) a maximum volume of incoming cellular traffic that is incoming to a member of said particular IoT group within a pre-defined time-period; and (B) a minimum volume of incoming cellular traffic that is incoming to a member of said particular IoT group within a pre-defined time-period.

15. The system of claim 1,
wherein the baseline behavior determination unit is to generate said RBCCB profile of said particular IoT group, which indicates at least:
(a) a maximum total volume of outgoing cellular traffic that a member of said particular IoT group is allowed to send within a pre-defined time period; and
(b) a maximum number of outgoing cellular transmissions that a member of said particular IoT group is allowed to send within a pre-defined time period.

16. The system of claim 1,
wherein the baseline behavior determination unit is to generate said RBCCB profile of said particular IoT group, based on an obtained list of cellular communications threshold values and threshold ranges that a member of said particular IoT group is allowed to perform within a pre-defined time-period.

17. The system of claim 1,
wherein the baseline behavior determination unit is to update said RBCCB profile of said particular IoT group, based on an indication or an identification that members of said particular IoT group received a firmware update or a security patch.

18. The system of claim 1,
wherein the baseline behavior determination unit is to determine said RBCCB based at least on clustering of data-points representing the number of outgoing cellular transmissions that are transmitted by each one of said multiple IoT devices within a pre-defined time-period.

19. The system of claim 1,
wherein the baseline behavior determination unit is to determine said RBCCB based at least on clustering of data-points representing the number of incoming cellular receptions that are received by each one of said multiple IoT devices within a pre-defined time-period.

20. The system of claim 1,
wherein the baseline behavior determination unit is to determine said RBCCB based at least on clustering of data-points representing the total upstream volume of outgoing cellular transmissions that are transmitted by each one of said multiple IoT devices within a pre-defined time-period.

21. The system of claim 1,
wherein the baseline behavior determination unit is to determine said RBCCB based at least on clustering of data-points representing the total downstream volume of incoming cellular receptions that are received by each one of said multiple IoT devices within a pre-defined time-period.

22. The system of claim 1,
wherein the baseline behavior determination unit is to determine said RBCCB based at least on clustering of data-points representing the time-length of upstream cellular transmissions that are transmitted by each one of said multiple IoT devices within a pre-defined time-period.

23. The system of claim 1,
wherein the baseline behavior determination unit is to determine said RBCCB based at least on clustering of data-points representing the time-length of downstream cellular receptions that are received by each one of said multiple IoT devices within a pre-defined time-period.

24. The system of claim 1,
wherein the baseline behavior determination unit is to generate said RBCCB profile which indicates that all members of said particular IoT group send upstream cellular transmissions only to a single particular Internet Protocol (IP) destination address;
wherein the outlier detector comprises an Internet Protocol (IP) destination address abnormality detector, (i) to determine that said particular IoT device sends one or more upstream cellular transmissions to another IP destination address, and (ii) to determine that said particular IoT device is malfunctioning or compromised.

25. The system of claim 1,
wherein the baseline behavior determination unit is to generate said RBCCB profile which indicates that all members of said particular IoT group receive downstream cellular transmissions only from a single particular Internet Protocol (IP) originating address;
wherein the outlier detector comprises an Internet Protocol (IP) originating address abnormality detector, (i) to determine that said particular IoT device receives one or more downstream cellular communications from another IP destination address, and (ii) to determine that said particular IoT device is malfunctioning or compromised.

26. The system of claim 1,
wherein the baseline behavior determination unit is to generate said RBCCB profile which indicates that all members of said particular IoT group send upstream cellular transmissions only to a particular set of Internet Protocol (IP) destination addresses;
wherein the outlier detector comprises an Internet Protocol (IP) destination address abnormality detector, (i) to determine that said particular IoT device sends one or more upstream cellular transmissions to another IP destination address which is not in said particular set of IP destination addresses, and (ii) to determine that said particular IoT device is malfunctioning or compromised.

27. The system of claim 1,
wherein the baseline behavior determination unit is to generate said RBCCB profile which indicates that all members of said particular IoT group receive downstream cellular transmissions only from a particular set of Internet Protocol (IP) originating addresses;
wherein the outlier detector comprises an Internet Protocol (IP) originating address abnormality detector, (i) to determine that said particular IoT device receives one or more downstream cellular communications from another IP destination address that is not in said particular set of IP originating addresses, and (ii) to determine that said particular IoT device is malfunctioning or compromised.

28. The system of claim 1,
wherein the baseline behavior determination unit is to generate said RBCCB profile which indicates that each upstream cellular transmission, that is typically performed by each member of said particular IoT group, has a total length of between M1 to M2 bytes, wherein M1 and M2 are pre-defined threshold values;
wherein the outlier detector comprises a data volume abnormality detector, (i) to determine that said particular IoT device sends at least one upstream cellular transmission that has a total length which is not between M1 to M2 bytes, and (ii) to determine that said particular IoT device is malfunctioning or compromised.

29. The system of claim 1,
wherein the baseline behavior determination unit is to generate said RBCCB profile which indicates that each downstream cellular transmission, that is typically received by each member of said particular IoT group, has a total length of between M1 to M2 bytes, wherein M1 and M2 are pre-defined threshold values;
wherein the outlier detector comprises a data volume abnormality detector, (i) to determine that said particular IoT device receives at least one downstream cellular transmission that has a total length which is not between M1 to M2 bytes, and (ii) to determine that said particular IoT device is malfunctioning or compromised.

30. The system of claim 1,
wherein the baseline behavior determination unit is to generate said RBCCB profile which indicates that each member of said particular IoT group, sends out between N1 and N2 discrete cellular transmissions within a time-period of T hours, wherein N1 and N2 and T are pre-defined threshold values;
wherein the outlier detector comprises a communication frequency abnormality detector, (i) to determine that said particular IoT device sends out D discrete cellular transmissions within T hours, wherein D is not between N1 to N2 bytes, and (ii) to determine that said particular IoT device is malfunctioning or compromised.

31. The system of claim 1,
wherein the baseline behavior determination unit is to generate said RBCCB profile which indicates that each member of said particular IoT group, establishes between N1 and N2 core network connection requests per T hours, wherein N1 and N2 and T are pre-defined threshold values;

wherein the outlier detector comprises a communication frequency abnormality detector, (i) to determine that said particular IoT device establishes R core network connection requests per T hours, wherein D is not between N1 to N2, and (ii) to determine that said particular IoT device is malfunctioning or compromised.

32. The system of claim 1,
wherein the baseline behavior determination unit is to generate said RBCCB profile which indicates that each upstream cellular transmission, that is typically performed by each member of said particular IoT group, has a total time-duration of between M1 to M2 seconds, wherein M1 and M2 are pre-defined threshold values;
wherein the outlier detector comprises a time-duration abnormality detector, (i) to determine that said particular IoT device sends at least one upstream cellular transmission that has a total time-duration which is not between M1 to M2 seconds, and (ii) to determine that said particular IoT device is malfunctioning or compromised.

33. The system of claim 1,
wherein the baseline behavior determination unit is to generate said RBCCB profile which indicates that each upstream cellular transmission, that is typically performed by each member of said particular IoT group, is performed by a particular application running on each member of said particular IoT group;
wherein the outlier detector comprises an application abnormality detector, (i) to determine that said particular IoT device sends at least one upstream cellular transmission via another application running on said particular IoT device, and (ii) to determine that said particular IoT device is malfunctioning or compromised.

34. The system of claim 1,
wherein the baseline behavior determination unit is to generate said RBCCB profile which indicates that each upstream cellular transmission, that is typically performed by each member of said particular IoT group, is performed within a particular time-window;
wherein the outlier detector comprises a communication time-window abnormality detector, (i) to determine that said particular IoT device sends at least one upstream cellular transmission during a time-slot that is outside of said particular time-window, and (ii) to determine that said particular IoT device is malfunctioning or compromised.

35. The system of claim 1,
wherein the baseline behavior determination unit is to generate said RBCCB profile which indicates that each member of said particular IoT group, performs up to N upstream cellular transmissions per day;
wherein the outlier detector comprises an excessive communications detector, (i) to determine that said particular IoT device performs more than N upstream cellular transmissions per day, and (ii) to determine that said particular IoT device is malfunctioning or compromised.

36. The system of claim 1,
wherein the baseline behavior determination unit is to generate said RBCCB profile based on a previously-obtained or previously-prepared database which stores data indicating baseline cellular communication rules that pertain to different types of IoT devices.

37. The system of claim 1,
wherein the baseline behavior determination unit is to dynamically update said RBCCB profile of said particular IoT group, based on continued Machine Learning (ML) of traffic-related behavior of members of said particular IoT group.

38. The system of claim 1,
wherein the outlier detector is
(i) to detect that said particular IoT device exhibits cellular communication activity that is sufficiently dissimilar, beyond a pre-defined threshold of dissimilarity, from said RBCCB profile of said particular IoT group, and
(ii) to trigger said enforcement actions generator to perform one or more enforcement operations with regard to said particular IoT device.

39. The system of claim 1,
wherein the outlier detector is
(i) to detect that said particular IoT device exhibits cellular communication activity that is sufficiently dissimilar, beyond a pre-defined threshold of dissimilarity, from said RBCCB profile of said particular IoT group, and
(ii) to detect that there exists an authorized cause for said cellular communication activity, and
(iii) to determine that said cellular communication activity is a false positive, and to avoid triggering of said enforcement actions generator.

40. The system of claim 1,
wherein the enforcement actions generator is to send a notification, to an owner or an operator of said particular IoT group, indicating (i) an identifier of said particular IoT device, and (ii) an indication that said particular IoT device is malfunctioning or compromised.

41. The system of claim 1,
wherein the enforcement actions generator is to quarantine all cellular traffic that is sent from said particular IoT device.

42. The system of claim 1,
wherein the enforcement actions generator is to quarantine all cellular traffic that is directed to said particular IoT device.

43. The system of claim 1,
wherein the enforcement actions generator is to quarantine all cellular traffic that is directed to said particular IoT device, except for cellular traffic that originates from a genuine owner of said IoT device.

44. The system of claim 1,
wherein, upon detection that said particular IoT device is malfunctioning or compromised, the enforcement actions generator activates a blacklist-based selective quarantine module (i) to define a blacklist of network destinations and network senders that said particular IoT device is not authorized to communicate with, and (ii) to selectively block relaying of all cellular traffic that is outgoing from said particular IoT device to one or more particular destinations that are in said blacklist, and also (iii) to selectively block relaying of all cellular traffic that is incoming to said particular IoT device from one or more particular senders that are in said blacklist.

45. The system of claim 1,
wherein, upon detection that said particular IoT device is malfunctioning or compromised, the enforcement actions generator activates a whitelist-based selective quarantine module (i) to define a whitelist of network destinations and network senders that only with them said particular IoT device is authorized to communicate, and (ii) to selectively block relaying of all cellular traffic that is outgoing from said particular IoT device to one or more particular destinations that are not in said whitelist, and also (iii) to selectively block relaying of all cellular traffic that is incoming to said particular IoT device from one or more particular senders that are not in said whitelist.

46. A method comprising:
monitoring at least one of: (a) data traffic, (b) operations-and-management traffic, (c) control messages, that relate to cellular communication between (I) an Internet of Things (IoT) device and (II) a core network of a Cellular Service Provider (CSP);
grouping multiple IoT devices into a particular IoT group, based on at least one of: (A) pre-defined data that indicates that said multiple IoT devices belong to a same entity; (B) pre-defined data that indicates that said multiple IoT devices are operated by a same entity; (C) dynamically generated data that indicates that said multiple devices exhibit same communication pattern over a particular time-period;
determining a Regular Baseline Cellular Communication Behavior (RBCCB) profile that characterizes the cellular communications that are outgoing from and incoming to each member of said particular IoT group;
subsequently, detecting that a particular IoT device of said particular IoT group, exhibits cellular traffic characteristics that are abnormal relative to the RBCCB profile that was characterized for said particular IoT group;
wherein said detecting comprises: (I) determining that said particular IoT device belongs to a particular type of IoT devices, (II) determining that said particular type of IoT devices typically communicates with remote destinations by utilizing a first particular communication protocol, (III) determining that said particular IoT device communicates with a remote destination by at least one communication session that utilizes a communication protocol that is different from said first particular communication protocol, and (IV) determining that said particular IoT device is malfunctioning or compromised;
performing one or more enforcement operations with regard to said particular IoT device which exhibits cellular traffic characteristics that are abnormal relative to the RBCCB profile that was characterized for said particular IoT group.

47. A non-transitory storage medium having stored thereon instructions that, when executed by a machine, cause the machine to perform a method comprising:
monitoring at least one of: (a) data traffic, (b) operations-and-management traffic, (c) control messages, that relate to cellular communication between (I) an Internet of Things (IoT) device and (II) a core network of a Cellular Service Provider (CSP);
grouping multiple IoT devices into a particular IoT group, based on at least one of: (A) pre-defined data that indicates that said multiple IoT devices belong to a same entity; (B) pre-defined data that indicates that said multiple IoT devices are operated by a same entity; (C) dynamically generated data that indicates that said multiple devices exhibit same communication pattern over a particular time-period;
determining a Regular Baseline Cellular Communication Behavior (RBCCB) profile that characterizes the cellular communications that are outgoing from and incoming to each member of said particular IoT group;
subsequently, detecting that a particular IoT device of said particular IoT group, exhibits cellular traffic characteristics that are abnormal relative to the RBCCB profile that was characterized for said particular IoT group,
by performing: (I) determining that said particular IoT device belongs to a particular type of IoT devices, (II) determining that said particular type of IoT devices typically communicates with remote destinations by utilizing a first particular communication protocol, (III) determining that said particular IoT device communicates with a remote destination by at least one communication session that utilizes a communication protocol that is different from said first particular communication protocol, and (IV) determining that said particular IoT device is malfunctioning or compromised;
performing one or more enforcement operations with regard to said particular IoT device which exhibits cellular traffic characteristics that are abnormal relative to the RBCCB profile that was characterized for said particular IoT group.

48. The system of claim 1,
wherein the outlier detector is configured (I) to determine that said particular IoT device belongs to a particular type of IoT devices, (II) to determine that said particular type of IoT devices sends data only to a single particular domain, (III) to determine that said particular IoT device sends data to another, different, domain, and (IV) to determine that said particular IoT device is malfunctioning or compromised.

49. The system of claim 1,
wherein the outlier detector is configured (I) to determine that said particular IoT device belongs to a particular type of IoT devices, (II) to perform a Deep Packet Inspection (DPI) analysis of at least the payload of upstream packets, (III) to determine from said DPI analysis of the payload of upstream packets that said particular type of IoT devices sends data via a first particular application, (IV) to determine via Deep Packet Inspection (DPI) analysis that said particular IoT device sends data via a second, different, application, and (IV) to determine that said particular IoT device is malfunctioning or compromised.

50. The system of claim 1,
wherein the enforcement actions generator is to steer HTTP traffic of said particular IoT device to an inspection engine for detection of a Bot or a malware.

* * * * *